(12) United States Patent
Poteet et al.

(10) Patent No.: US 11,001,719 B2
(45) Date of Patent: May 11, 2021

(54) MULTI-LAYER COATING FOR A FLOW SURFACE OF AN AIRCRAFT COMPONENT

(71) Applicant: Rohr, Inc., Chula Vista, CA (US)

(72) Inventors: Steven Poteet, Hamden, CT (US); Vijay V. Pujar, San Diego, CA (US); Teresa Kruckenberg, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 271 days.

(21) Appl. No.: 16/131,367

(22) Filed: Sep. 14, 2018

(65) Prior Publication Data

US 2020/0087522 A1    Mar. 19, 2020

(51) Int. Cl.
*C09D 7/61* (2018.01)
*C09D 171/00* (2006.01)
(Continued)

(52) U.S. Cl.
CPC .............. *C09D 7/61* (2018.01); *C09D 171/00* (2013.01); *C09D 175/04* (2013.01); *C09D 183/04* (2013.01); *F02C 7/04* (2013.01); *B64D 2045/009* (2013.01); *C08K 3/22* (2013.01); *C08K 2003/3045* (2013.01); *C08K 2003/321* (2013.01); *F05D 2220/323* (2013.01); *F05D 2240/10* (2013.01); *F05D 2260/97* (2013.01);
(Continued)

(58) Field of Classification Search
CPC ... B05D 2202/00; B32B 15/095; B32B 15/20; B32B 27/283; B64C 1/00; B64D 2045/009; C08G 77/06; C08G 77/14; C08G 77/26; C08K 3/04; C08K 3/22; C08K 3/24; C08K 3/32; C08K 7/06; C08K 2003/221; C08K 2003/3045; C08K 3003/321; C09D 5/084; C09D 7/61; C09D 171/00; C09D 175/04; C09D 183/04; C23C 18/00; F02C 7/04; F05D 2220/323; F05D 2240/10; F05D 2260/97; F05D 2300/21; F05D 2300/43; F05D 2300/611
See application file for complete search history.

(56) References Cited

U.S. PATENT DOCUMENTS 5,213,617 A * 5/1993 Blizzard ................ C08J 7/0427
                                                        106/287.13
5,736,249 A * 4/1998 Smith ...................... B05D 5/00
                                                        428/413

(Continued)

FOREIGN PATENT DOCUMENTS

| JP | 2017165024 A | 9/2017 |
|---|---|---|
| WO | 2014109177 | 7/2014 |

OTHER PUBLICATIONS

EP search report for EP19197220.7 dated Feb. 18, 2020.

*Primary Examiner* — Ramsey Zacharia
(74) *Attorney, Agent, or Firm* — Getz Balich LLC

(57) ABSTRACT

A component is provided for an aircraft. This aircraft component includes an object and a multi-layer coating. The object includes an object surface. The multi-layer coating includes a barrier layer and a laminar flow layer. The covers at least a portion of the object surface. The barrier layer a fluoropolyether, a silicon rubber and/or a polyurethane. The laminar flow layer covers the barrier layer and forms an exterior surface of the component. The laminar flow layer includes a sol-gel siloxane, a rare-earth oxide and/or a phosphate.

20 Claims, 2 Drawing Sheets

(51) Int. Cl.

| | |
|---|---|
| *C09D 175/04* | (2006.01) |
| *C09D 183/04* | (2006.01) |
| *F02C 7/04* | (2006.01) |
| *C08K 3/22* | (2006.01) |
| *B64D 45/00* | (2006.01) |
| *C08K 3/30* | (2006.01) |
| *C08K 3/32* | (2006.01) |

(52) U.S. Cl.
CPC ...... *F05D 2300/21* (2013.01); *F05D 2300/43* (2013.01); *F05D 2300/611* (2013.01)

(56) References Cited

U.S. PATENT DOCUMENTS

| | | |
|---|---|---|
| 5,968,240 A | 10/1999 | Myers et al. |
| 5,973,068 A * | 10/1999 | Yamaya ............... C09D 183/04 524/865 |
| 6,171,704 B1 | 1/2001 | Mosser et al. |
| 7,915,371 B2 | 3/2011 | Byrd et al. |
| 9,567,468 B1 | 2/2017 | Liu |
| 9,676,965 B2 | 6/2017 | Schmidt |
| 2005/0282953 A1 | 12/2005 | Simendinger et al. |
| 2011/0171458 A1 | 7/2011 | Burger |
| 2011/0206900 A1 | 8/2011 | Iwase |
| 2011/0319581 A1* | 12/2011 | Yamaguchi .......... C08G 65/336 526/247 |
| 2013/0035400 A1* | 2/2013 | Nguyen ................ C09D 5/38 514/770 |
| 2013/0136936 A1 | 5/2013 | Morozumi |
| 2014/0170382 A1 | 6/2014 | Iwase |
| 2016/0047036 A1 | 2/2016 | Iwase |
| 2017/0350020 A1 | 12/2017 | Ding et al. |

\* cited by examiner

MULTI-LAYER COATING FOR A FLOW SURFACE OF AN AIRCRAFT COMPONENT

BACKGROUND

1. Technical Field

This disclosure relates generally to coatings and, more particularly, to a multi-layer coating for an aircraft component.

2. Background Information

Various coatings are known in the art for use with aircraft components. While these known coatings have various advantages, there is still room in the art for improvement.

SUMMARY OF THE DISCLOSURE

According to an aspect of the present disclosure, a component for an aircraft is provided. This aircraft component includes an object and a multi-layer coating. The object includes an object surface. The multi-layer coating includes a barrier layer and a laminar flow layer. The barrier layer covers at least a portion of the object surface. The barrier layer includes a fluoropolyether, a silicon rubber and/or a polyurethane. The laminar flow layer covers the barrier layer and forms an exterior surface of the component. The laminar flow layer includes a sol-gel siloxane, a rare-earth oxide and/or a phosphate.

According to another aspect of the present disclosure, an apparatus is provided that includes a metal object and a multi-layer coating that consists of (only includes) a barrier layer and a flow layer. The metal object includes an object surface. The barrier layer covers at least a portion of the object surface. The barrier layer includes a fluoropolyether, a silicon rubber and/or a polyurethane. The flow layer covers the barrier layer and forms an exterior surface of the component. The laminar flow layer includes a sol-gel siloxane, a rare-earth oxide and/or a phosphate. The apparatus is configured as a component of an aircraft.

According to still another aspect of the present disclosure, another apparatus is provided that includes a metal object and a multi-layer coating that consists of (only includes) a barrier layer, a flow layer and a primer between the barrier layer and the flow layer. The barrier layer covers at least a portion of the object surface. The barrier layer includes a fluoropolyether, a silicon rubber and/or a polyurethane. The flow layer covers the barrier layer and forms an exterior surface of the component. The flow layer includes a sol-gel siloxane, a rare-earth oxide and/or a phosphate. The apparatus is configured as a component of an aircraft.

The object may be a metal object.

The object surface of the metal object may be anodized and/or sealed.

The object may be configured as a nacelle noselip skin.

The object may be configured as a flight control skin.

The barrier layer may be configured from or otherwise include the fluoropolyether.

The barrier layer may be configured from or otherwise include the silicon rubber.

The barrier layer may be configured from or otherwise include the polyurethane.

The barrier layer may be doped with at least one inhibitor.

The inhibitor may include $ZnMoO_4$, $Pr_2O_3$, Ce-citrate, magnesium silicate, graphene nanoplatelets, alkali earth sulfate, zinc oxide and/or yttrium oxide.

The inhibitor may include (a) barium sulfate or calcium sulfate and (b) $Pr(OH)_3$.

The laminar flow layer may be configured from or otherwise include the sol-gel siloxane.

The laminar flow layer may be configured from or otherwise include the rare-earth oxide.

The rare-earth oxide may be configured from or otherwise include $CeO_2$ and/or $LaPO_4$.

The laminar flow layer may be configured from or otherwise include phosphate.

The barrier layer may be applied directly onto the object surface.

The laminar flow layer may be applied directly onto the barrier layer.

The multi-layer coating may also include a primer between the barrier layer and the laminar flow layer.

The primer may be configured from or otherwise include a functionalized alkoxysilane including a hydrolysable unit, (3-glycidoxypropy)trimethoxysilane and/or an aminoethyl-aminopropyltrimethoxysilane.

The foregoing features and the operation of the invention will become more apparent in light of the following description and the accompanying drawings.

DETAILED DESCRIPTION

Figure 1:
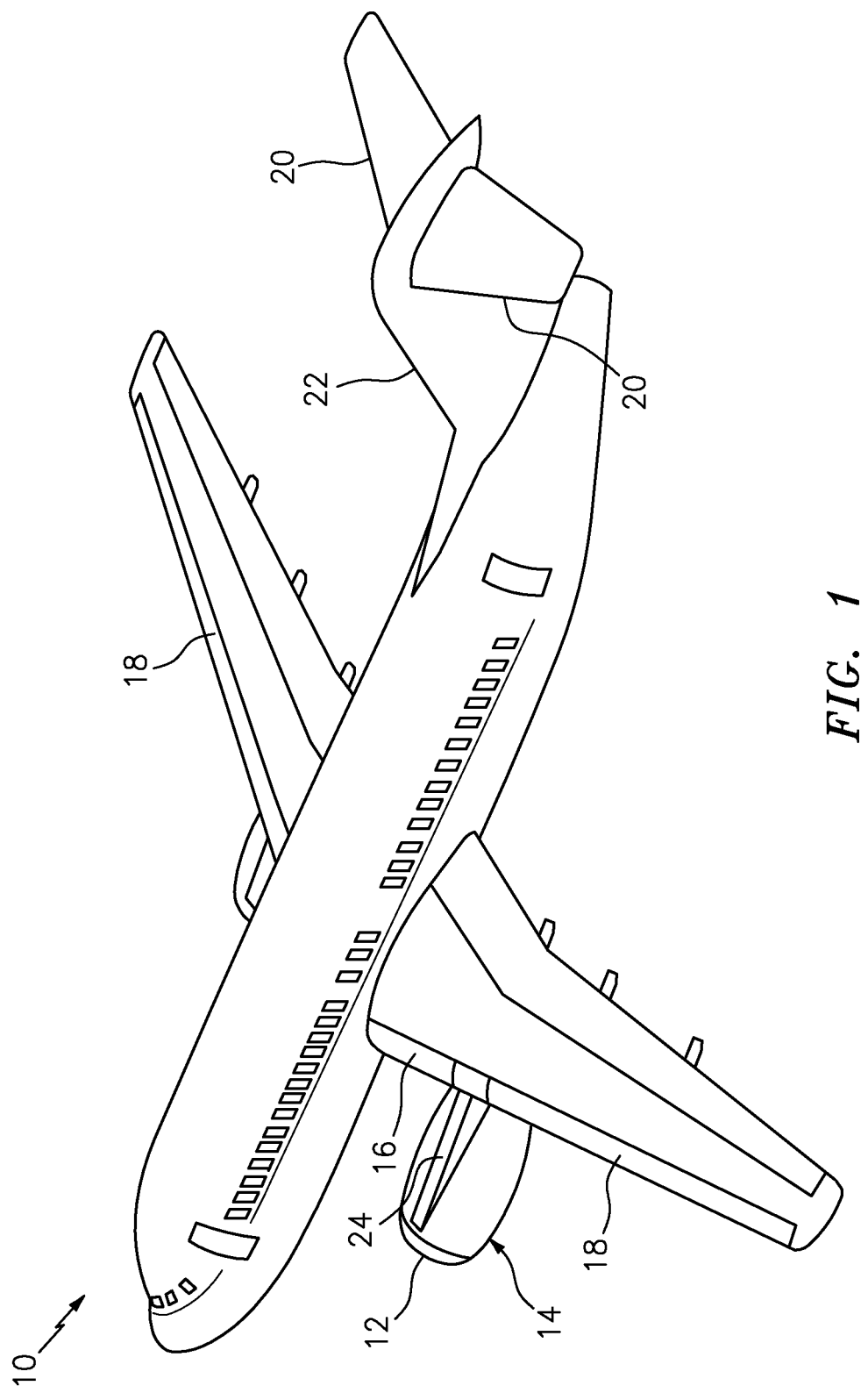
FIG. 1 is a perspective illustration of an aircraft, in accordance with various embodiments.

FIG. 1 is a perspective illustration of an aircraft 10 such as a passenger airliner. This aircraft 10 includes various exterior components with aerodynamic exterior flow surfaces. Examples of such exterior components include, but are not limited to, a noselip 12 of a nacelle 14 for a propulsion system, an aircraft flight control component as well as other aircraft components with leading edges. Examples of a flight control component include, but are not limited to, a wing leading edge flap 16 and a wing leading edge slat 18. Examples of other aircraft components with leading edges include, but are not limited to, a stabilizer wing 20, a tail wing 22 and an engine pylon 24. The present disclosure, of course, is not limited to the foregoing exemplary aircraft components. The present disclosure is also not limited to the foregoing exemplary aircraft configuration. For example, in other embodiments, the aircraft 10 may alternatively be configured as a business-type jet, a cargo plane, a propeller plane, a helicopter or any other type of aircraft.

An aircraft component with an aerodynamic exterior flow surface, such as the components described above, may be contaminated and/or damaged during aircraft operation with/by debris. Examples of debris include, but are not limited to, insects, dirt and ice. Accumulation of debris on the flow surface and/or damage (e.g., pitting, wear, etc.) to the flow surface caused by debris may negatively affect natural laminar flow over the flow surface of the component. A reduction in laminar flow may in turn reduce aircraft efficiency; e.g., reduce propulsion system fuel efficiency.

Therefore, to prevent or reduce likelihood of debris related contamination and/or damage to the flow surface of the aircraft component, the aircraft component may include a multi-layer coating as described herein.

Figure 2:
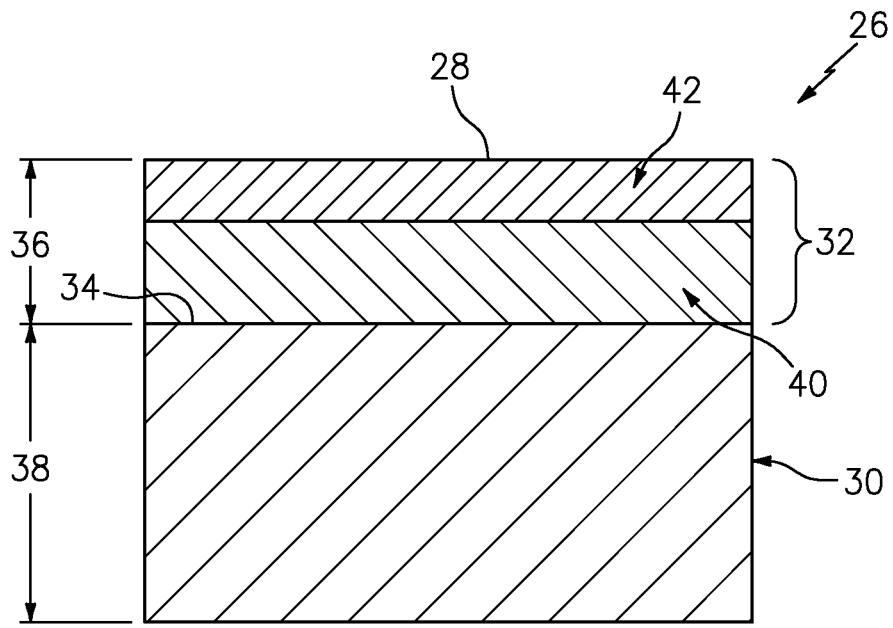
FIG. 2 is a sectional illustration of a portion of an exterior component with an aerodynamic exterior flow surface for an aircraft, in accordance with various embodiments.

FIG. 2 is a sectional illustration of a portion of an exterior component 26 with an aerodynamic exterior flow surface 28 for an aircraft such as the aircraft 10. This component 26 may be configured as one of the exemplary exterior components described above, or any other component of an aircraft which forms an aerodynamic exterior flow surface of the aircraft. The component 26 of FIG. 2 includes an object 30 (e.g., a substrate) and a multi-layer coating 32.

The object 30 may be configured as a support and/or base structure of the component 26. More particularly, the object 30 may be configured to provide the component 26 with its structural integrity and characteristics (e.g., stiffness, etc.). The object 30 is also configured to provide the component 26 with its geometry and general size. For example, where the multi-layer coating 32 is applied substantially evenly over a surface 34 of the object 30 (object surface), the multi-layer coating 32 may not substantially (or at all) alter the underlying geometry of the object 30. Rather, the multi-layer coating 32 may merely add to the size of the object 30.

In some embodiments, the object 30 may be configured as or otherwise include an aerodynamic exterior flow skin. The object 30, for example, may be configured as or otherwise include a nacelle noselip skin (e.g., a skin of noselip 12 of FIG. 1) or a flight control skin (e.g., a skin of component 16, 18, 20, 22 or 24 of FIG. 1). The present disclosure, of course, is not limited to the foregoing exemplary embodiments.

The object 30 may be formed from or otherwise include metal such as, but not limited to, aluminum (Al), titanium (Ti) or an alloy thereof. However, in other embodiments, the object 30 may alternatively be formed from or otherwise include non-metal such as, but not limited to, fiber-reinforced composite material. The present disclosure, of course, is not limited to the foregoing exemplary object materials.

The multi-layer coating 32 is applied (directly or indirectly) to and covers at least a portion (e.g., an entirety or a leading edge portion) of the object surface 34. The coating 32 may have a thickness 36 that is less than a thickness 38 of the object 30. For example, the object thickness 38 may be between about (e.g., +/−2%) 13,000 to 250 times (e.g., between 500 and 800 times) greater than the coating thickness 36. However, in other embodiments, the object thickness 38 may be less than 250 times greater than the coating thickness 36, or greater than 13,000 times greater than the coating thickness 36. For example, the object thickness may be as small as about 0.020 inches and the thickness 36 may be as large as about 0.005 inches such that the object thickness 38 is about four times (4×) greater than the coating thickness 36. The present disclosure, of course, is not limited to the foregoing exemplary dimensions or dimensional relationships.

The multi-layer coating 32 of FIG. 2 at least includes (or may only include) a barrier layer 40 and a laminar flow layer 42. Each of these layers 40, 42 may provide and/or promote various characteristics such as, but not limited to, decreased insect adhesion, increased durability and corrosion protection as discussed below in further detail. In combination, the layers 40 and 42 may provide and/or promote various additional characteristics such as, but not limited to, transparency, relatively high temperature resistance and relatively high solvent resistance.

The barrier layer 40 is applied (directly or indirectly) to and covers at least a portion (e.g., an entirety or a leading edge portion) of the object surface 34. This barrier layer 40 may account for about (e.g., +/−2%) 93 to 98 percent of the coating thickness 36. The present disclosure, of course, is not limited to the foregoing exemplary dimensions. For example, in other embodiments, the barrier layer 40 may account for less than 97 percent of the coating thickness 36, or more than 95 percent of the coating thickness 36.

The barrier layer 40 may be configured to provide passive and/or active corrosion protection for the underlying object material. For example, for passive corrosion protection, the barrier layer 40 may at least include (or may only include) a fluoropolymer, a silicon rubber and/or a polyurethane. An example of a fluoropolymer containing material is, but is not limited to, the fluoropolymer containing material disclosed in U.S. Pat. No. 9,567,468, which is hereby incorporated herein by reference in its entirety.

For active corrosion protection, the barrier layer 40 may at least include (or may only include) at least one of the above-described barrier layer materials in combination with one or more inhibitors. More particularly, the barrier layer material may be doped with the one or more inhibitors. Examples of an inhibitor include, but are not limited to, $ZnMoO_4$, $Pr_2O_3$, Ce-citrate, magnesium silicate, graphene nanoplatelets, alkali earth sulfate, zinc oxide and/or yttrium oxide. Where the inhibitor is an alkali earth sulfate such as, but not limited to, barium/calcium sulfate, an additive such as $Pr(OH)_3$ may also be included in the barrier layer material. Examples of other inhibitors which may also or alternatively be included in the barrier layer material include those inhibitors disclosed in U.S. Publication No. 2017/0350020, which is hereby incorporated herein by reference in its entirety. The present disclosure, of course, is not limited to the exemplary fluoropolymer, silicon rubber, polyurethane or inhibitor materials described above. Furthermore, in some embodiments, the barrier layer material may also include one or more additives not described above.

The laminar flow layer 42 of FIG. 2 is applied directly to and covers at least a portion (e.g., an entirety or a leading edge portion) of the underlying barrier layer 40. This laminar flow layer 42 may account for about (e.g., +/−2%) 7 to 2 percent of the coating thickness 36. The present disclosure, of course, is not limited to the foregoing exemplary dimensions. For example, in other embodiments, the laminar flow layer 42 may account for less than 5 percent of the coating thickness 36, or more than 3 percent of the coating thickness 36.

The laminar flow layer 42 may form at least a portion (e.g., an entirety or a leading edge portion) of the flow surface 28 of the component 26. Thus, the laminar flow layer 42 may be directly exposed to air flowing along the component 26 during aircraft operation. As a result, the laminar flow layer 42 may also be directly exposed to debris carried by the air. Therefore, the laminar flow layer 42 is configured to promote laminar flow of the air over the component 26. More particularly, the laminar flow layer 42 is configured to increase durability of the component 26 as well as reduce debris (e.g., insect, direct and/or ice) adhesion to the flow surface 28. For example, the laminar flow layer 42 may at least include (or may only include) a sol-gel siloxane, a rare-earth oxide and a phosphate. The sol-gel siloxane containing material may also include a chlorosilane and/or a cross-linker. Such sol-gel siloxane containing material can provide nanostructuring, which can help to decrease surface energy; e.g., has relatively high hydrophobicity. Another example of a sol-gel siloxane containing material is disclosed in U.S. Publication No. 2005/0282953, which is hereby incorporated herein by reference in its entirety.

Examples of a rare-earth oxide include, but are not limited to, CeO2 and LaPO4, where the Ce and La may be replaced with any other rare-earth element such as, but not limited to, Pr, Sm, Eu, Gd, Tb, Dy, Ho, Er, and Yb. Such rare earth oxides are durable, high temperature resistant ceramics. The present disclosure, of course, is not limited to the exemplary sol-gel siloxane, rare-earth oxide or phosphate materials described above. Furthermore, in some embodiments, the laminar flow layer material may also include one or more additives not described above.

Figure 3:
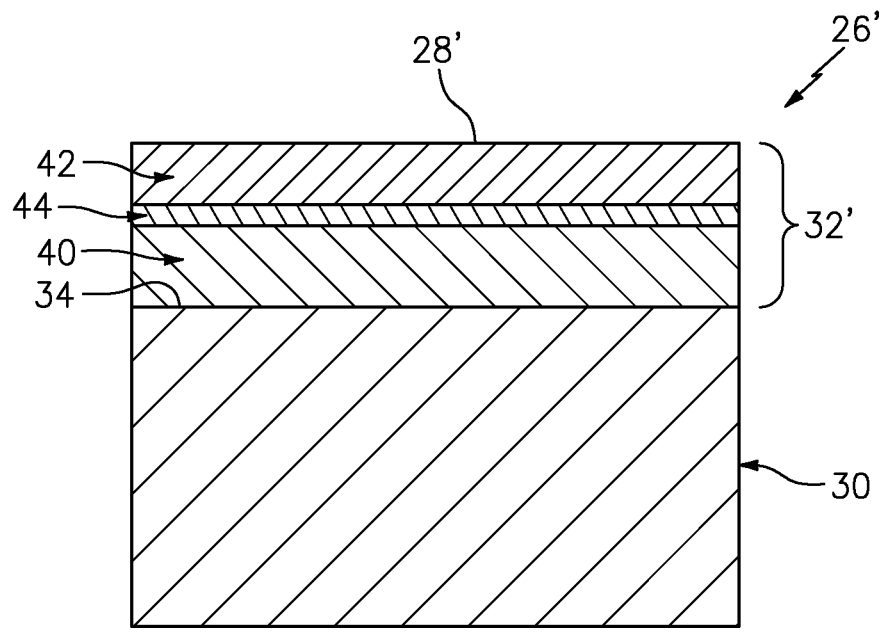
FIG. 3 is a sectional illustration of a portion of another exterior component with an aerodynamic exterior flow surface for an aircraft, in accordance with various embodiments.

FIG. 3 is a sectional illustration of a portion of another exterior component 26' with an aerodynamic exterior flow surface 28' for an aircraft such as the aircraft 10. Similar to the component 26 of FIG. 2, the component 26' of FIG. 3 may be configured as one of the exemplary exterior components described above, or any other component of an aircraft which forms an aerodynamic exterior flow surface of the aircraft. The component of FIG. 3 includes the object 30 and the layers 40 and 42 of the multi-layer coating 32 described above with reference to FIG. 2. However, in contrast to the component 26 of FIG. 2, a multi-layer coating 32' of FIG. 3 also includes a primer 44 disposed between the barrier layer 40 and the laminar flow layer 42. Thus, the laminar flow layer 42 is applied indirectly to the barrier layer 40 through the primer 44.

The primer 44 is applied (directly or indirectly) to and covers at least a portion (e.g., an entirety or a leading edge portion) of the underlying barrier layer 40. The primer 44 is configured to promote adhesion between the barrier layer 40 and the laminar flow layer 42, which layer 42 is applied (directly or indirectly) to and covers at least a portion (e.g., an entirety or a leading edge portion) of the underlying laminar flow layer 42.

The primer 44 may at least include (or may only include) a functionalized alkoxysilane that includes a hydrolysable ligand such as, but not limited to, a halide, an alkoxide, or an amine. The primer 44 may at least include (or may only include) (3-glycidoxypropy)trimethoxysilane and/or an aminoethylaminopropytrimethoxysilane (diaminofunctional silane). An example of a functionalized alkoxysilane is (3-aminopropyl)triethoxysilane. The silane may include 1 to 3 hydrolyzable units (alkoxy (e.g., ethoxy, methoxy, etc.) for bonding to a surface of the barrier layer 40 following hydrolysis and subsequent condensation. The terminal functional group may include amino, amide, carboxy, epoxide, etc. for bonding to the laminar flow layer 42. The halide may include Cl, Br or I for bonding to a surface of the barrier layer 40. In some embodiments, a mixture of hydrolysable units (e.g., mixture of alkoxy and halide) may also be considered. The present disclosure, of course, is not limited to the exemplary primer materials described above.

In some embodiments, the object 30 and its surface 34 may be conditioned prior to application of the multi-layer coating 32, 32'. This conditioning may promote enhanced adhesion between the object 30 and the barrier layer 40. The conditioning may also or alternatively provide enhanced corrosion protection of the object material. For example, where the object 30 is formed from metal (e.g., aluminum and aluminum alloy), the object surface 34 may be anodized and/or sealed.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A component, comprising:
an object including an object surface; and
a multi-layer coating comprising:
a barrier layer covering at least a portion of the object surface, the barrier layer comprising at least one of a fluoropolyether, a silicon rubber or a polyurethane; and
a laminar flow layer covering the barrier layer and forming an exterior surface of the component, the laminar flow layer consisting of at least one of a sol-gel siloxane, a rare-earth oxide or a phosphate, wherein the component is configured as a component of an aircraft.

2. The component of claim 1, wherein the object is a metal object.

3. The component of claim 2, wherein the object surface is at least one of anodized or sealed.

4. The component of claim 1, wherein the object is configured as a nacelle noselip skin or a flight control surface.

5. The component of claim 1, wherein the barrier layer comprises the fluoropolyether.

6. The component of claim 1, wherein the barrier layer comprises the silicon rubber.

7. The component of claim 1, wherein the barrier layer comprises the polyurethane.

8. The component of claim 1, wherein the barrier layer is doped with at least one inhibitor.

9. The component of claim 8, wherein the inhibitor comprises at least one of ZnMoO4, Pr2O3, Ce-citrate, magnesium silicate, graphene nanoplatelets, alkali earth sulfate, zinc oxide or yttrium oxide.

10. The component of claim 8, wherein the inhibitor comprises:
barium sulfate or calcium sulfate; and
Pr(OH)3.

11. The component of claim 1, wherein the laminar flow layer consists of the sol-gel siloxane.

12. The component of claim 1, wherein the laminar flow layer consists of the rare-earth oxide.

13. The component of claim 12, wherein the rare-earth oxide comprises at least one of CeO2 or LaPO4.

14. The component of claim 1, wherein the laminar flow layer consists of the phosphate.

15. The component of claim 1, wherein the barrier layer is applied directly onto the object surface.

16. The component of claim 1, wherein the laminar flow layer is applied directly onto the barrier layer.

17. The component of claim 1, wherein the multi-layer coating further comprises a primer between the barrier layer and the laminar flow layer.

18. The component of claim 17, wherein the primer comprises one of a functionalized alkoxysilane including a hydrolysable unit, (3-glycidoxypropy)trimethoxysilane and an aminoethylaminopropytrimethoxysilane.

19. An apparatus, comprising:
an object including an object surface; and
a multi-layer coating comprising a barrier layer and a flow layer;

the barrier layer covering at least a portion of the object surface, and the barrier layer comprising at least one of a fluoropolyether, a silicon rubber or a polyurethane; and the flow layer covering the barrier layer, and the flow layer comprising at least one of a sol-gel siloxane, a rare-earth oxide or a phosphate, wherein the at least one of the sol-gel siloxane, the rare-earth oxide or the phosphate forms an exterior surface of the apparatus;

wherein the apparatus is configured as a component of an aircraft.

20. An apparatus, comprising:

an object including an object surface; and a multi-layer coating comprising a barrier layer and a flow layer;

the barrier layer covering at least a portion of the object surface, and the barrier layer comprising at least one of a fluoropolyether, a silicon rubber or a polyurethane; and the flow layer covering the barrier layer and forming an exterior surface of the apparatus, and the flow layer consisting of at least one of a sol-gel siloxane, a rare-earth oxide or a phosphate;

wherein the apparatus is configured as a component of an aircraft; and wherein the object has an object thickness, the multi-layer coating has a multi-layer coating thickness that is less than the object thickness, and the barrier layer has a barrier layer thickness that is at least ninety-three percent of the multi-layer coating thickness.

* * * * *